(12) United States Patent
Takashita et al.

(10) Patent No.: US 12,378,645 B2
(45) Date of Patent: Aug. 5, 2025

(54) IRON-BASED MIXED POWDER FOR POWDER METALLURGY AND IRON-BASED SINTERED BODY

(71) Applicant: JFE STEEL CORPORATION, Tokyo (JP)

(72) Inventors: Takuya Takashita, Tokyo (JP); Nao Nasu, Tokyo (JP); Akio Kobayashi, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 592 days.

(21) Appl. No.: 17/594,163

(22) PCT Filed: Feb. 10, 2020

(86) PCT No.: PCT/JP2020/005169
§ 371 (c)(1),
(2) Date: Oct. 5, 2021

(87) PCT Pub. No.: WO2020/202805
PCT Pub. Date: Oct. 8, 2020

(65) Prior Publication Data
US 2022/0161321 A1  May 26, 2022

(30) Foreign Application Priority Data

Apr. 5, 2019 (JP) ................................ 2019-072867

(51) Int. Cl.
| | |
|---|---|
| B22F 1/05 | (2022.01) |
| B22F 1/00 | (2022.01) |
| B22F 1/10 | (2022.01) |
| B22F 1/12 | (2022.01) |
| B22F 3/16 | (2006.01) |
| B22F 3/24 | (2006.01) |
| C22C 33/02 | (2006.01) |
| C22C 38/12 | (2006.01) |

(52) U.S. Cl.
CPC ............ C22C 33/0207 (2013.01); B22F 1/00 (2013.01); B22F 1/09 (2022.01); B22F 1/10 (2022.01); B22F 1/12 (2022.01); B22F 3/16 (2013.01); B22F 3/24 (2013.01); C22C 38/12 (2013.01); B22F 2003/248 (2013.01); B22F 2301/10 (2013.01); B22F 2301/35 (2013.01); B22F 2302/40 (2013.01)

(58) Field of Classification Search
None
See application file for complete search history.

(56) References Cited

U.S. PATENT DOCUMENTS

| | | | | |
|---|---|---|---|---|
| 4,069,044 A | * | 1/1978 | Mocarski | C22C 33/0264 75/243 |
| 6,036,839 A | * | 3/2000 | Kohut | B22F 1/06 205/280 |
| 6,068,813 A | * | 5/2000 | Semel | B22F 1/10 75/255 |
| 8,167,971 B2 | | 5/2012 | Shimizu et al. | |
| 10,207,328 B2 | | 2/2019 | Takashita et al. | |
| 10,710,155 B2 | | 7/2020 | Takashita et al. | |
| 2001/0037842 A1 | * | 11/2001 | Hayashi | C22C 38/16 148/332 |
| 2002/0050186 A1 | * | 5/2002 | Hanawa | C09C 1/627 75/343 |
| 2016/0136727 A1 | * | 5/2016 | Maetani | C21D 6/00 75/252 |
| 2017/0259340 A1 | | 9/2017 | Takashita et al. | |
| 2018/0178291 A1 | | 6/2018 | Takashita et al. | |
| 2018/0193908 A1 | | 7/2018 | Takashita et al. | |
| 2018/0193911 A1 | | 7/2018 | Kobayashi et al. | |
| 2019/0390308 A1 | | 12/2019 | Kobayashi et al. | |

FOREIGN PATENT DOCUMENTS

| | | |
|---|---|---|
| CA | 2968321 A1 | 6/2016 |
| CN | 107000052 A | 8/2017 |
| CN | 108025357 A | 5/2018 |
| CN | 108026614 A | 5/2018 |
| JP | H02145703 A | 6/1990 |

(Continued)

OTHER PUBLICATIONS

Jul. 27, 2022, Office Action issued by the Canadian Intellectual Property Office in the corresponding Canadian Patent Application No. 3,132,343.
Jan. 4, 2024, Office Action issued by the China National Intellectual Property Administration in the corresponding Chinese Patent Application No. 202080027215.6 with English language concise statement of relevance.
May 11, 2022, the Extended European Search Report issued by the European Patent Office in the corresponding European Patent Application No. 20782154.7.
Oct. 21, 2022, Office Action issued by the Korean Intellectual Property Office in the corresponding Korean Patent Application No. 10-2021-7031996 with English language concise statement of relevance.
Apr. 14, 2020, International Search Report issued in the International Patent Application No. PCT/JP2020/005169.

(Continued)

Primary Examiner — George Wyszomierski
(74) Attorney, Agent, or Firm — KENJA IP LAW PC

(57) ABSTRACT

Provided is a steel strip joining method that can appropriately evaluate risk of a fracture in a joined part and prevent a fracture more reliably. An iron-based mixed powder for powder metallurgy comprises: an iron-based alloy powder; and an alloying powder, wherein the iron-based alloy powder contains Mo: 0.2 mass % or more and 1.5 mass % or less, the alloying powder contains a graphite powder and a copper powder, a ratio of a mass of the graphite powder to a total mass of the iron-based alloy powder and the alloying powder is 0.10 mass % to 1.0 mass %, a ratio of a mass of the copper powder to the total mass of the iron-based alloy powder and the alloying powder is 0.5 mass % to 3.0 mass %, and the copper powder has an average particle size of 25 μm or less, and a specific surface area of 0.30 m²/g or more.

12 Claims, No Drawings

(56) References Cited

FOREIGN PATENT DOCUMENTS

| JP | 2007031757 A | 2/2007 |
|---|---|---|
| JP | 2013047378 A | 3/2013 |
| JP | 2016108651 A | 6/2016 |
| JP | 2017226921 A | 12/2017 |
| JP | 2018016881 A | 2/2018 |
| JP | 2018123412 A | 8/2018 |
| JP | 2018123428 A | 8/2018 |
| KR | 1020170080668 A | 7/2017 |
| WO | 2012008196 A1 | 1/2012 |
| WO | 2017047100 A1 | 3/2017 |
| WO | 2018143088 A1 | 8/2018 |

OTHER PUBLICATIONS

Apr. 20, 2021, Notification of Reasons for Refusal issued by the Japan Patent Office in the corresponding Japanese Patent Application No. 2020-523460 with English language Concise Statement of Relevance.
Aug. 10, 2021, Decision of refusal issued by the Japan Patent Office in the corresponding Japanese Patent Application No. 2020-523460 with English language Concise Statement of Relevance.
Fukuda Metal Foil & Powderco.,Ltd, Ultra High Pressure Swirl Water Atomized Powder, Apr. 30, 2016.
JFE Steel Corporation, Reduced Iron Powders Atomized Iron and Steel Powders, JFE product catalog, Jan. 2015, Cat. No. J1J-001-03.
Jun. 1, 2021, Notification of Reasons for Refusal issued by the Japan Patent Office in the corresponding Japanese Patent Application No. 2020-523460 with English language Concise Statement of Relevance.
Kazuaki Nishiyabu et al., Behavior of Debinding and Sintering in Micron and Submicron-Sized Copper Powder Injection Molded Parts, Transactions of the Japan Society of Mechanical Engineers Series A, Nov. 2013, pp. 1593-1603, vol. 79, Issue 807.
Unami Shigeru et al., Ni-Free Alloyed Steel Powder FM Series for High Strength Sintered Compacts with Excellent Machinability, JFE Giho, Aug. 2010, pp. 54-59, No. 26.
Apr. 6, 2023, Office Action issued by the Canadian Intellectual Property Office in the corresponding Canadian Patent Application No. 3,132,343.
Dec. 16, 2022, Office Action issued by the China National Intellectual Property Administration in the corresponding Chinese Patent Application No. 202080027215.6 with English language search report.
Huang Xiaoxing et al., Research progress of iron-copper sintered alloy, Powder Metallurgy Technology, Apr. 2015, pp. 133-139, vol. 33, No. 2.
Aug. 30, 2024, Office Action issued by the China National Intellectual Property Administration in the corresponding Chinese Patent Application No. 202080027215.6 with English language concise statement of relevance.
Zheng Shuilin et al., Surface modification of powders, Sep. 2011, with a partial English translation.
Nov. 21, 2024, Office Action issued by the China National Intellectual Property Administration in the corresponding Chinese Patent Application No. 202080027215.6 with English language concise statement of relevance.

* cited by examiner

IRON-BASED MIXED POWDER FOR POWDER METALLURGY AND IRON-BASED SINTERED BODY

TECHNICAL FIELD

The present disclosure relates to an iron-based mixed powder for powder metallurgy, and particularly relates to an iron-based mixed powder for powder metallurgy that enables obtaining an iron-based sintered body having high strength without containing an expensive alloying element. The present disclosure also relates to an iron-based sintered body obtainable using the iron-based powder for powder metallurgy.

BACKGROUND

Powder metallurgical techniques enable producing parts having complicated shapes in shapes (i.e., near net shapes) extremely close to product shapes, with high dimensional accuracy. Powder metallurgical techniques thus contribute to significantly reduced machining costs. For this reason, powder metallurgical products are used as various machines and parts in many fields.

Recently, there is strong demand for powder metallurgical products having improved strength for reduction in size and weight of parts. In particular, products (iron-based sintered bodies) obtained by sintering iron-based powders are highly required to have high strength. Meanwhile, there is also a great need for reduction in production costs of parts, and raw material powders that enable obtaining high-strength iron-based sintered bodies with inexpensive raw material and process are in strong demand.

However, particularly for production of high-strength sintered parts of more than 1300 MPa in tensile strength, an alloy powder containing 4 mass % Ni which is an expensive alloying element needs to be used. This causes high material costs. Moreover, when producing such high-strength sintered parts, it is necessary to perform sintering at a high temperature exceeding 1200° C. and further perform carburizing, quenching, and tempering treatments. This causes high production costs.

For sintering of powder metallurgical products, a continuous sintering furnace called a belt furnace is typically used. In the belt furnace, sintering is continuously performed while conveying parts on a mesh belt. This has the advantages of excellent productivity and low running costs. However, since the sintering temperature in the belt furnace is about 1150° C. at a maximum, a tray pusher furnace that is inferior in productivity needs to be used in order to perform sintering at a high temperature exceeding 1200° C. as mentioned above. Besides, in the case where sintering is performed at such a high temperature, the furnace body wears severely, and the running costs increase.

This stimulates various studies to obtain high-strength sintered parts by inexpensive processes.

For example, JP 2017-226921 A (PTL 1) proposes a powder for powder metallurgy containing a fine copper powder of 10 μm or less in average particle size. This powder enables obtaining high-strength sintered parts even with sintering at a sintering temperature of about 1130° C. using a typical belt furnace and carburizing-quenching-tempering treatments.

JP 2016-108651 A (PTL 2) proposes a powder for powder metallurgy containing a flat copper powder. This powder enables obtaining high-strength sintered parts even with sintering using a typical belt furnace and carburizing-quenching-tempering treatments.

JP 2018-123412 A (PTL 3) proposes a Mo—Ni—Cu—C iron-based mixed powder for powder metallurgy. This mixed powder enables obtaining a sintered body having a tensile strength of 1300 MPa or more even with sintering using a typical belt furnace and carburizing-quenching-tempering treatments.

JP 2007-031757 A (PTL 4) proposes a powder obtained by pre-alloying at least one alloying element selected from the group consisting of Al, Si, P, Ti, V, Cr, Zn, Sn, and W to yield an iron-based alloy powder and further concentrating the alloying element on the surface of the iron-based alloy powder. This powder enables obtaining a sintered body having a tensile strength of 1300 MPa or more even with sintering using a typical belt furnace and carburizing-quenching-tempering treatments.

CITATION LIST

Patent Literature

PTL 1: JP 2017-226921 A
PTL 2: JP 2016-108651 A
PTL 3: JP 2018-123412 A
PTL 4: JP 2007-031757 A

SUMMARY

Technical Problem

The tensile strength of a sintered body obtained using the powder proposed in PTL 1 is about 1250 MPa. Thus, a tensile strength of 1300 MPa or more cannot be achieved.

Likewise, the tensile strength of a sintered body obtained using the powder proposed in PTL 2 is about 1250 MPa. Thus, a tensile strength of 1300 MPa or more cannot be achieved.

The powder proposed in PTL 3 enables obtaining a sintered body having a tensile strength of 1300 MPa or more. However, the powder contains Ni which is an expensive alloying element, and cannot meet the need for cost reduction.

Each alloying element that can be contained in the powder proposed in PTL 4 is easily oxidizable. Hence, when producing a sintered body using the powder, sintering needs to be performed in an atmosphere subjected to advanced dew point control. This requires a line capable of advanced dew point control, and also lowers the productivity. Moreover, since each alloying element used in PTL 4 is easily oxidizable, it is difficult to produce the powder by a typical water atomizing process. Therefore, even if the alloying element itself is inexpensive, the production costs for the powder are high.

It could therefore be helpful to provide an iron-based mixed powder for powder metallurgy that enables producing a sintered body having a tensile strength of 1300 MPa or more by a typical production process without containing an expensive alloying element such as Ni or an easily-oxidizable element such as Al.

Solution to Problem

We thus provide the following.
1. An iron-based mixed powder for powder metallurgy, comprising: an iron-based alloy powder; and an alloying powder, wherein the iron-based alloy powder contains Mo: 0.2 mass % or more and 1.5 mass % or less, the alloying powder contains a graphite powder and a copper powder, a ratio of a mass of the graphite powder to a total mass of the iron-based alloy powder and the alloying powder is 0.10 mass % to 1.0 mass %, a ratio of a mass of the copper powder to the total mass of the iron-based alloy powder and the alloying powder is 0.5 mass % to 3.0 mass %, and the copper powder has an average particle size of 25 μm or less, and a specific surface area of 0.30 m$^2$/g or more.

2. The iron-based mixed powder for powder metallurgy according to 1., wherein the iron-based alloy powder has a chemical composition containing (consisting of) Mo: 0.2 mass % or more and 1.5 mass % or less with a balance consisting of Fe and inevitable impurities.
3. The iron-based mixed powder for powder metallurgy according to 1. or 2., further comprising a lubricant.
4. An iron-based sintered body obtainable by forming and sintering the iron-based mixed powder for powder metallurgy according to any one of 1. to 3.
5. An iron-based sintered body obtainable by forming, sintering, and heat-treating the iron-based mixed powder for powder metallurgy according to any one of 1. to 3.

Advantageous Effect

It is thus possible to produce a sintered body having a tensile strength of 1300 MPa or more by a typical production process without containing an expensive alloying element such as Ni or an easily-oxidizable element such as Al. Not only the iron-based mixed powder for powder metallurgy itself is inexpensive, but also the sintered body can be produced by the typical process. The iron-based mixed powder for powder metallurgy can thus be used to produce a sintered body having excellent strength at very low costs.

DETAILED DESCRIPTION

A method for carrying out the presently disclosed techniques will be described in detail below. The following description concerns preferred embodiments of the present disclosure. Herein, "%" with regard to content denotes "mass %" unless otherwise noted.

[Iron-Based Mixed Powder for Powder Metallurgy]

An iron-based mixed powder for powder metallurgy (hereafter also simply referred to as "mixed powder") according to one of the disclosed embodiments is a mixed powder containing an iron-based alloy powder and an alloying powder. Herein, "iron-based mixed powder" denotes a mixed powder in which the Fe content with respect to the whole mixed powder is 50% or more.

[Iron-Based Alloy Powder]

In the present disclosure, the iron-based alloy powder contains Mo as an alloying element. Herein, "iron-based alloy powder" denotes an alloy powder in which the Fe content is 50% or more. Herein, the content of each component contained in the iron-based alloy powder denotes the ratio (mass %) of the mass of the component contained in the iron-based alloy powder to the total mass of the iron-based alloy powder.

In one of the disclosed embodiments, the iron-based alloy powder contains 0.2% or more and 1.5% or less Mo. If the Mo content in the iron-based alloy powder is less than 0.2%, the quench hardenability decreases, and a sintered body having the desired strength cannot be obtained. The Mo content in the iron-based alloy powder is therefore 0.2% or more. If the Mo content in the iron-based alloy powder is more than 1.5%, the powder hardens, as a result of which the compressibility decreases. The Mo content in the iron-based alloy powder is therefore 1.5% or less.

The type of the iron-based alloy powder is not limited, and one or both of a pre-alloyed steel powder and a diffusionally adhered alloy steel powder may be used. In other words, Mo contained in the iron-based alloy powder may be pre-alloyed in the iron-based alloy powder, or diffusionally adhered to the surface of the iron-based alloy powder. Herein, "diffusionally adhered alloy steel powder" denotes a powder that is composed of an iron powder as a core and at least one alloying element particle adhered to the surface of the iron powder and in which the iron powder and the alloying element particle are diffusion bonded, and is also referred to as "partially diffusion-alloyed steel powder".

In the present disclosure, the balance of the iron-based alloy powder may consist of Fe and inevitable impurities. That is, in another one of the disclosed embodiments, the iron-based alloy powder has a chemical composition containing Mo: 0.2% to 1.5% with the balance consisting of Fe and inevitable impurities.

Examples of the inevitable impurities include C, O, N, and S. By reducing the amount of the inevitable impurities, the compressibility of the powder can be further improved, and a green compact having a higher density can be obtained. Accordingly, in the chemical composition of the iron-based alloy powder, the C content is preferably 0.02 mass % or less. The O content is preferably 0.3 mass % or less, and more preferably 0.25 mass % or less. The N content is preferably 0.004 mass % or less. The S content is preferably 0.03 mass % or less.

The method of producing the iron-based alloy powder is not limited, and any method may be used. For example, the iron-based alloy powder may be an atomized powder produced by an atomizing method, a reduced powder produced by a reduction method, or a mixed powder thereof. As the atomized powder, any of a water atomized powder produced by a water atomizing method and a gas atomized powder produced by a gas atomizing method may be used, but a water atomized powder is preferable from the viewpoint of productivity.

[Alloying Powder]

The alloying powder contains a graphite powder and a copper powder. In other words, the mixed powder according to the present disclosure contains a graphite powder and a copper powder as the alloying powder.

Graphite Powder: 0.10% to 1.0%

C contained in the graphite powder has the effect of improving the strength of the sintered body. If the content of the graphite powder is less than 0.10%, the effect is insufficient, and a sintered body having the desired strength cannot be obtained. The content of the graphite powder is therefore 0.10% or more. If the content of the graphite powder is more than 1.0%, the sintered body is hypereutectoid, so that cementite precipitates and the strength decreases. The content of the graphite powder is therefore 1.0% or less. Herein, the content of the graphite powder denotes the ratio (mass %) of the mass of the graphite powder to the total mass of the iron-based alloy powder and the alloying powder.

The particle size of the graphite powder is not limited, but a graphite powder having an average particle size of 1 μm to 50 μm is preferable.

Copper Powder: 0.5% to 3.0%

Cu is a component having the effect of enhancing the strength of the sintered body by solid solution strengthening and quench hardenability improvement. To achieve the strength improving effect, the content of the copper powder is 0.5% or more. Excessive addition of the copper powder causes a decrease in the density of the sintered body due to copper expansion resulting from copper melting during sintering. The content of the copper powder is therefore 3.0% or less. Herein, the content of the copper powder denotes the ratio (mass %) of the mass of the copper powder to the total mass of the iron-based alloy powder and the alloying powder.

Average Particle Size: 25 μm or Less

If the average particle size of the copper powder is more than 25 μm, Cu that has melted during sintering infiltrates between the particles of the iron-based alloy powder and expands the volume of the parts after the sintering, causing a decrease in the density of the sintered body. If the average particle size of the copper powder is more than 25 μm, the distribution of copper in the green compact is not uniform. This causes a state in which sintering is facilitated by copper in some regions and not facilitated by copper in other regions. Hence, in the field of powder metallurgy, a copper powder having an average particle size of about 28 μm to 50 μm is typically used. In the case where such a copper powder is used, however, the decrease in the density of the sintered body and the nonuniformity of sintering cannot be suppressed. In view of this, in the present disclosure, the average particle size of the copper powder is 25 μm or less. The average particle size is preferably 10 μm or less, and more preferably 5 μm or less. No lower limit is placed on the average particle size. However, an excessively fine copper powder may generate heat in the air. From the viewpoint of preventing such heat generation in the air, the average particle size is preferably 1 μm or more, more preferably 2 μm or more, and further preferably 5 μm or more.

Herein, the average particle size denotes the median size (D50) of the primary particles of the copper powder. The median size can be measured by a laser diffraction-scattering type particle size distribution measurement device.

Specific Surface Area: 0.30 $m^2/g$ or More

By increasing the specific surface area of the copper powder, copper can be uniformly dispersed in the sintered body to facilitate sintering. If the specific surface area of the copper powder is less than 0.30 $m^2/g$, this effect cannot be achieved, and a sintered body having the desired strength cannot be obtained. The specific surface area of the copper powder is therefore 0.30 $m^2/g$ or more. Although no upper limit is placed on the specific surface area of the copper powder, the specific surface area may be 1.0 $m^2/g$ or less in industrial terms. Herein, the specific surface area denotes a BET specific surface area measured by a BET method.

As the alloying powder, only the graphite powder and the copper powder may be used. That is, in one of the disclosed embodiments, the alloying powder consists of the graphite powder and the copper powder. Alternatively, in another one of the disclosed embodiments, the alloying powder may optionally further contain a powder of at least one other alloy component. Examples of the powder of the other alloy component include a Mn powder and a Ni powder. That is, in the embodiment, the graphite powder, the copper powder, and optionally one or both of the Mn powder and the Ni powder may be used as the alloying powder. Here, since Ni is expensive as mentioned above, the iron-based mixed powder for powder metallurgy according to the present disclosure preferably does not contain the Ni powder.

[Lubricant]

An iron-based mixed powder for powder metallurgy according to another one of the disclosed embodiments may further contain a lubricant in addition to the foregoing components.

The lubricant is not limited, and any lubricant may be used. As the lubricant, for example, one or more selected from the group consisting of metal soaps such as zinc stearate and lithium stearate and amide-based waxes such as ethylenebisstearamide. In the case of adding the lubricant, the content of the lubricant is not limited, but is preferably 0.1 parts to 1.2 parts by mass with respect to 100 parts by mass of the total mass of the iron-based alloy powder and the alloying powder.

The lubricant may be added at any timing. For example, the lubricant may be added to the iron-based alloy powder simultaneously with the alloying powder, or added to the mixed powder obtained by mixing the alloying powder into the iron-based alloy powder.

[Method of Producing Iron-Based Sintered Body]

An example of the method of producing an iron-based sintered body using the foregoing iron-based mixed powder for powder metallurgy will be described below. The following description concerns an example of the method of producing the iron-based sintered body, and the present disclosure is not limited to such. In the following description, "iron-based sintered body" is also simply referred to as "sintered body".

The iron-based sintered body can be produced by pressing the iron-based mixed powder for powder metallurgy using a die to yield a green compact and then sintering the green compact.

Pressing

The pressing force during the pressing is not limited, but is preferably 400 MPa to 1000 MPa. If the pressing force is 400 MPa or more, the density of the green compact increases, with it being possible to further improve the properties of the sintered body. If the pressing force is 1000 MPa or less, the life of the die can be extended, which is economically advantageous. The temperature during the pressing is preferably normal temperature (approximately 20° C.) to approximately 160° C. A lubricant may be applied or adhered to the die used for the pressing beforehand.

Sintering

The green compact may be sintered at any sintering temperature that is not limited, but the sintering temperature is preferably 1100° C. or more and less than 1200° C. If the sintering temperature is 1100° C. or more, the sintering progresses sufficiently, as a result of which an iron-based sintered body having an excellent tensile strength of 1300 MPa or more as an example can be obtained. If the sintering temperature is less than 1200° C., the life of the sintering furnace can be extended, which is economically advantageous. The sintering time is not limited, but is preferably 10 min to 180 min.

Heat Treatment

The obtained iron-based sintered body may be further subjected to a heat treatment. The heat treatment can further enhance the strength of the sintered body. As the heat treatment, a treatment involving rapid cooling is preferable. For example, one or more heat treatments selected from the group consisting of carburizing treatment, bright treatment, induction hardening, and laser quenching are preferably performed. The sintered body after the rapid cooling may be subjected to a toughness recovery treatment such as tempering. The tempering temperature is preferably about 100° C. to 300° C.

Example S

More detailed description will be given below by way of examples. The following examples merely represent preferred examples of the present disclosure, and the present disclosure is not limited to these examples.

First, a mixed powder containing an iron-based alloy powder, a graphite powder, and a copper powder was produced in the following manner.

(Iron-Based Alloy Powder)

As the iron-based alloy powder, a diffusionally adhered alloy steel powder (partially diffusion-alloyed steel powder) containing Mo in the content shown in Table 1 with the balance consisting of Fe and inevitable impurities was used. The diffusionally adhered alloy steel powder was produced in the following manner.

First, an iron powder was produced by a water atomizing method. Herein, "iron powder" denotes a powder consisting of Fe and inevitable impurities, and is also called a pure iron powder in this technical field. The purity of the iron powder was 95 mass % or more. The iron powder (water-atomized iron powder) as-water-atomized (as-atomized) was mixed with an oxidized Mo powder (average particle size: 10 μm). The mixing was performed for 15 min using a V-shaped mixer. After this, a heat treatment (holding temperature: 880° C., holding time: 1 h) was performed in a hydrogen atmosphere with a dew point of 30° C., to diffusionally adhere Mo to the surface of the iron powder and obtain a diffusionally adhered alloy steel powder. The Mo content in the diffusionally adhered alloy steel powder (iron-based alloy powder) is shown in Table 1.

(Graphite Powder)

As the graphite powder, a graphite powder having an average particle size of 5 μm was used.

(Copper Powder)

As the copper powder, a copper powder having the average particle size (μm) and the specific surface area ($m^2/g$) shown in Table 1 was used.

The graphite powder and the copper powder were added to the iron-based alloy powder so as to be in the respective contents shown in Table 1, and further ethylenebisstearamide as a lubricant was added to the mixture. After this, mixing was performed for 15 min using a V-shaped mixer to obtain an iron-based mixed powder for powder metallurgy. The amount of the lubricant added was 0.6 parts by mass with respect to 100 parts by mass of the total mass of the iron-based alloy powder and the alloying powder (the graphite powder and the copper powder).

The obtained iron-based mixed powder for powder metallurgy was then pressed at 688 MPa to produce five tablet-shaped green compacts of 55 mm in length, 10 mm in width, and 10 mm in thickness and a ring-shaped green compact of 38 mm in outer diameter, 25 mm in inner diameter, and 10 mm in thickness.

The tablet-shaped green compacts and the ring-shaped green compact were sintered to obtain tablet-shaped iron-based sintered bodies and a ring-shaped iron-based sintered body. The sintering was performed at a sintering temperature of 1130° C. for a sintering time of 20 min in a propane converted gas atmosphere.

(Density)

The outer diameter, inner diameter, thickness, and mass of the obtained ring-shaped iron-based sintered body were measured, and the density ($Mg/m^3$) of the iron-based sintered body was calculated using the measured values.

(Tensile Strength)

The obtained five tablet-shaped sintered bodies were each worked into a round bar tensile test piece of 5 mm in parallel portion diameter to be submitted to the tensile test defined in JIS Z 2241, and subjected to gas carburizing (holding temperature: 870° C., holding time: 60 min) of a carbon potential of 0.8 mass % and then to quenching (60° C., oil quenching) and tempering (holding temperature: 180° C., holding time: 60 min). These round bar tensile test pieces that had undergone the carburizing-quenching-tempering treatments were each submitted to the tensile test defined in JIS Z 2241 to measure the tensile strength, and an average value of the number of test pieces n=5 was calculated.

The measurement results are shown in Table 1. A tensile strength of 1300 MPa or more was rated as "pass", and a tensile strength of less than 1300 MPa was rated as "fail".

As can be understood from the results in Table 1, all iron-based sintered bodies produced using the iron-based mixed powders for powder metallurgy satisfying the conditions according to the present disclosure had a tensile strength of 1300 MPa or more after the heat treatment, and had excellent mechanical properties.

TABLE 1

| | Iron-based mixed powder for powder metallurgy | | | | | | | |
|---|---|---|---|---|---|---|---|---|
| | Iron-based alloy powder | Alloying powder | | | | Iron-based sintered body | | |
| | | Graphite | Copper powder | | | | | |
| No | Mo content (mass %) | powder Content (mass %) | Content (mass %) | Average particle size (μm) | Specific surface area ($m^2/g$) | Density ($Mg/m^3$) | Tensile strength (MPa) | Remarks |
| 1 | 0.1 | 0.3 | 1.0 | 20 | 0.45 | 7.22 | 1220 | Comparative Example |
| 2 | 0.2 | 0.3 | 1.0 | 20 | 0.45 | 7.22 | 1320 | Example |
| 3 | 0.4 | 0.3 | 1.0 | 20 | 0.45 | 7.21 | 1380 | Example |
| 4 | 0.6 | 0.3 | 1.0 | 20 | 0.45 | 7.21 | 1400 | Example |
| 5 | 0.8 | 0.3 | 1.0 | 20 | 0.45 | 7.21 | 1405 | Example |
| 6 | 1.0 | 0.3 | 1.0 | 20 | 0.45 | 7.18 | 1370 | Example |
| 7 | 1.5 | 0.3 | 1.0 | 20 | 0.45 | 7.16 | 1340 | Example |
| 8 | 2.0 | 0.3 | 1.0 | 20 | 0.45 | 7.12 | 1295 | Comparative Example |
| 9 | 0.4 | 0.05 | 1.0 | 20 | 0.45 | 7.20 | 950 | Comparative Example |
| 10 | 0.4 | 0.2 | 1.0 | 20 | 0.45 | 7.20 | 1340 | Example |
| 11 | 0.4 | 0.5 | 1.0 | 20 | 0.45 | 7.21 | 1370 | Example |
| 12 | 0.4 | 1.0 | 1.0 | 20 | 0.45 | 7.22 | 1320 | Example |
| 13 | 0.4 | 1.5 | 1.0 | 20 | 0.45 | 7.23 | 1100 | Comparative Example |
| 14 | 0.4 | 0.3 | 0.2 | 20 | 0.45 | 7.19 | 1290 | Comparative Example |
| 15 | 0.4 | 0.3 | 0.5 | 20 | 0.45 | 7.20 | 1340 | Example |

TABLE 1-continued

Iron-based mixed powder for powder metallurgy

| | Iron-based alloy powder | Alloying powder | | | | Iron-based sintered body | | |
|---|---|---|---|---|---|---|---|---|
| | | Graphite | Copper powder | | | | | |
| No | Mo content (mass %) | powder Content (mass %) | Content (mass %) | Average particle size (μm) | Specific surface area (m²/g) | Density (Mg/m³) | Tensile strength (MPa) | Remarks |
| 16 | 0.4 | 0.3 | 1.5 | 20 | 0.45 | 7.21 | 1375 | Example |
| 17 | 0.4 | 0.3 | 2.0 | 20 | 0.45 | 7.17 | 1350 | Example |
| 18 | 0.4 | 0.3 | 3.0 | 20 | 0.45 | 7.13 | 1304 | Example |
| 19 | 0.4 | 0.3 | <u>3.5</u> | 20 | 0.45 | 7.10 | 1250 | Comparative Example |
| 20 | 0.4 | 0.3 | 1.0 | <u>35</u> | 0.40 | 7.17 | 1260 | Comparative Example |
| 21 | 0.4 | 0.3 | 1.0 | <u>30</u> | 0.40 | 7.18 | 1270 | Comparative Example |
| 22 | 0.4 | 0.3 | 1.0 | <u>24</u> | 0.45 | 7.19 | 1330 | Example |
| 23 | 0.4 | 0.3 | 1.0 | 15 | 0.50 | 7.22 | 1390 | Example |
| 24 | 0.4 | 0.3 | 1.0 | 10 | 0.60 | 7.22 | 1400 | Example |
| 25 | 0.4 | 0.3 | 1.0 | 5 | 0.60 | 7.23 | 1420 | Example |
| 26 | 0.8 | 0.3 | 2.0 | 22 | <u>0.28</u> | 7.19 | 1260 | Comparative Example |
| 27 | 0.8 | 0.3 | 2.0 | 21 | <u>0.35</u> | 7.20 | 1300 | Example |
| 28 | 0.8 | 0.3 | 2.0 | 20 | 0.40 | 7.20 | 1340 | Example |
| 29 | 0.8 | 0.3 | 2.0 | 20 | 0.50 | 7.21 | 1402 | Example |
| 30 | 0.8 | 0.3 | 2.0 | 20 | 0.60 | 7.22 | 1380 | Example |

The invention claimed is:

1. An iron-based mixed powder for powder metallurgy, comprising:
   an iron-based alloy powder; and
   an alloying powder,
   wherein the iron-based alloy powder contains Mo: 0.2 mass % or more and 1.5 mass % or less,
   the alloying powder contains a graphite powder and a copper powder,
   a ratio of a mass of the graphite powder to a total mass of the iron-based alloy powder and the alloying powder is 0.10 mass % to 1.0 mass %,
   a ratio of a mass of the copper powder to the total mass of the iron-based alloy powder and the alloying powder is 0.5 mass % to 3.0 mass %, and
   the copper powder has an average particle size of 15 μm or more and 25 μm or less, and a specific surface area of 0.30 m²/g to 0.60 m²/g, the average particle size of the copper powder being defined as a median size of primary particles of the copper powder measured by a laser diffraction-scattering type particle size distribution measurement device.

2. The iron-based mixed powder for powder metallurgy according to claim 1, wherein the iron-based alloy powder has a chemical composition containing Mo: 0.2 mass % or more and 1.5 mass % or less with a balance consisting of Fe and inevitable impurities.

3. The iron-based mixed powder for powder metallurgy according to claim 2, further comprising
   a lubricant.

4. An iron-based sintered body obtainable by pressing and sintering the iron-based mixed powder for powder metallurgy according to claim 3.

5. An iron-based sintered body obtainable by pressing, sintering, and heat-treating the iron-based mixed powder for powder metallurgy according to claim 3.

6. An iron-based sintered body obtainable by pressing and sintering the iron-based mixed powder for powder metallurgy according to claim 2.

7. An iron-based sintered body obtainable by pressing, sintering, and heat-treating the iron-based mixed powder for powder metallurgy according to claim 2.

8. The iron-based mixed powder for powder metallurgy according to claim 1, further comprising
   a lubricant.

9. An iron-based sintered body obtainable by pressing and sintering the iron-based mixed powder for powder metallurgy according to claim 8.

10. An iron-based sintered body obtainable by pressing, sintering, and heat-treating the iron-based mixed powder for powder metallurgy according to claim 8.

11. An iron-based sintered body obtainable by pressing and sintering the iron-based mixed powder for powder metallurgy according to claim 1.

12. An iron-based sintered body obtainable by pressing, sintering, and heat-treating the iron-based mixed powder for powder metallurgy according to claim 1.

* * * * *